(12) United States Patent
Balde

(10) Patent No.: US 11,807,136 B2
(45) Date of Patent: Nov. 7, 2023

(54) VEHICLE SEAT WITH COMPENSATION SYSTEM

(71) Applicant: FAURECIA Sièges d'Automobile, Nanterre (FR)

(72) Inventor: Mamadou Saliou Balde, Morigny-Champigny (SE)

(73) Assignee: FAURECIA Sièges d'Automobile, Nanterre (FR)

( * ) Notice: Subject to any disclaimer, the term of this patent is extended or adjusted under 35 U.S.C. 154(b) by 532 days.

(21) Appl. No.: 16/928,119

(22) Filed: Jul. 14, 2020

(65) Prior Publication Data
US 2021/0016683 A1 Jan. 21, 2021

(30) Foreign Application Priority Data

Jul. 15, 2019 (FR) ..................................... 19 07924

(51) Int. Cl.
| | |
|---|---|
| B60N 2/60 | (2006.01) |
| B60N 2/00 | (2006.01) |
| B60N 2/64 | (2006.01) |
| G01K 13/00 | (2021.01) |
| G01L 1/14 | (2006.01) |
| G01L 1/20 | (2006.01) |
| G01L 1/22 | (2006.01) |

(52) U.S. Cl.
CPC ............. *B60N 2/002* (2013.01); *B60N 2/64* (2013.01); *G01K 13/00* (2013.01); *G01L 1/146* (2013.01); *G01L 1/205* (2013.01); *G01L 1/2281* (2013.01)

(58) Field of Classification Search
CPC ................................. B60N 2/002; B60N 2/64
See application file for complete search history.

(56) References Cited

U.S. PATENT DOCUMENTS

| | | | | | |
|---|---|---|---|---|---|
| 5,821,633 | A | * | 10/1998 | Burke | .................... G06V 40/10 |
| | | | | | 180/282 |
| 6,345,839 | B1 | * | 2/2002 | Kuboki | ............. B60R 21/01516 |
| | | | | | 73/862.632 |
| 6,818,842 | B2 | * | 11/2004 | Gray | ...................... B60N 2/002 |
| | | | | | 177/144 |
| 7,113,603 | B1 | | 9/2006 | Cahill | |
| 8,559,655 | B2 | | 10/2013 | Mihelich | |
| 9,061,603 | B2 | | 6/2015 | Fischer | |
| 9,694,714 | B2 | | 7/2017 | Shin | |

(Continued)

FOREIGN PATENT DOCUMENTS

| | | |
|---|---|---|
| CN | 106183914 A | 12/2016 |
| CN | 108593187 A | 9/2018 |

(Continued)

OTHER PUBLICATIONS

French Search Report for French App. No. 1907924 dated Mar. 13, 2020, BET200134 FR, 7 pages, (No English Translation Available).

*Primary Examiner* — Syed A Islam
(74) *Attorney, Agent, or Firm* — BARNES & THORNBURG LLP

(57) ABSTRACT

A seat comprising a temperature or a humidity sensor, a foam and a measurement system comprising a capacitive sensor in contact with the foam and adapted for measuring pressure exerted on the foam by the user, a compensation suited to the measured pressure being determined based on a temperature or a humidity provided by the temperature or the humidity sensor.

11 Claims, 5 Drawing Sheets

(56) References Cited

U.S. PATENT DOCUMENTS

| | | |
|---|---|---|
| 2005/0154516 A1 | 7/2005 | Dirand |
| 2007/0030983 A1 | 2/2007 | Aarts |
| 2007/0194900 A1 | 8/2007 | Hawkins |
| 2016/0103031 A1* | 4/2016 | Tham .................... C04B 35/653 |
| | | 264/497 |
| 2016/0187372 A1* | 6/2016 | He ........................ G01P 15/125 |
| | | 216/13 |
| 2018/0031511 A1 | 2/2018 | Kim |
| 2018/0333093 A1* | 11/2018 | Gallagher ............ A61B 5/0205 |

FOREIGN PATENT DOCUMENTS

| | | |
|---|---|---|
| EP | 2695769 A1 | 2/2014 |
| FR | 2863704 A1 | 6/2005 |
| WO | 2007016527 A1 | 2/2007 |
| WO | 2018167538 A1 | 9/2018 |

* cited by examiner

VEHICLE SEAT WITH COMPENSATION SYSTEM

PRIORITY CLAIM

This application claims priority to French Patent Application No. 19 07924, filed Jul. 15, 2019, which is expressly incorporated by reference herein.

BACKGROUND

The present application relates to the field of monitoring a vehicle seat occupant. In particular the present application relates to the detection and compensation of measurements of pressure exerted by an automotive vehicle seat occupant.

SUMMARY

According to the present disclosure, a seat comprises at least one temperature and/or humidity sensor, foam, and a measurement system comprising at least one capacitive sensor in contact with the foam and adapted for measuring pressure exerted on the foam by a user.

In illustrative embodiments, a compensation suited to the measured pressure is determined based on a temperature and/or a humidity provided by the at least one temperature and/or humidity sensor.

In illustrative embodiments, a capacitive sensor is a sensor comprising at least one electrode, where the electrode serves to detect and measure a distance variation and, indirectly, a pressure or a pressure variation.

In illustrative embodiments, at least one electrode forms a capacitor with the foam. Thereafter, even a slight compression of the foam causes a movement of the at least one electrode, which is measurable. The determination of a distance variation is obtained from the capacitance of the capacitor, where the value of the capacitance varies proportionally with the permittivity of the dielectric medium between the sensor and the foam. Further, the capacitance varies proportionally with the surface area of the electrode of the sensor, and inversely with the distance.

In illustrative embodiments, a compensation suited to the measured pressure is defined as a compensation of the foam with which to balance the measured pressure. A variation of the capacitance of the one or more capacitive sensors in contact with the foam results when there is pressure on the foam.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

The drawings and description below contain, for the most part, elements of definite nature. They will therefore not only serve to make the present disclosure better understood, but also contribute to the definition thereof, as applicable.

Figure 1:
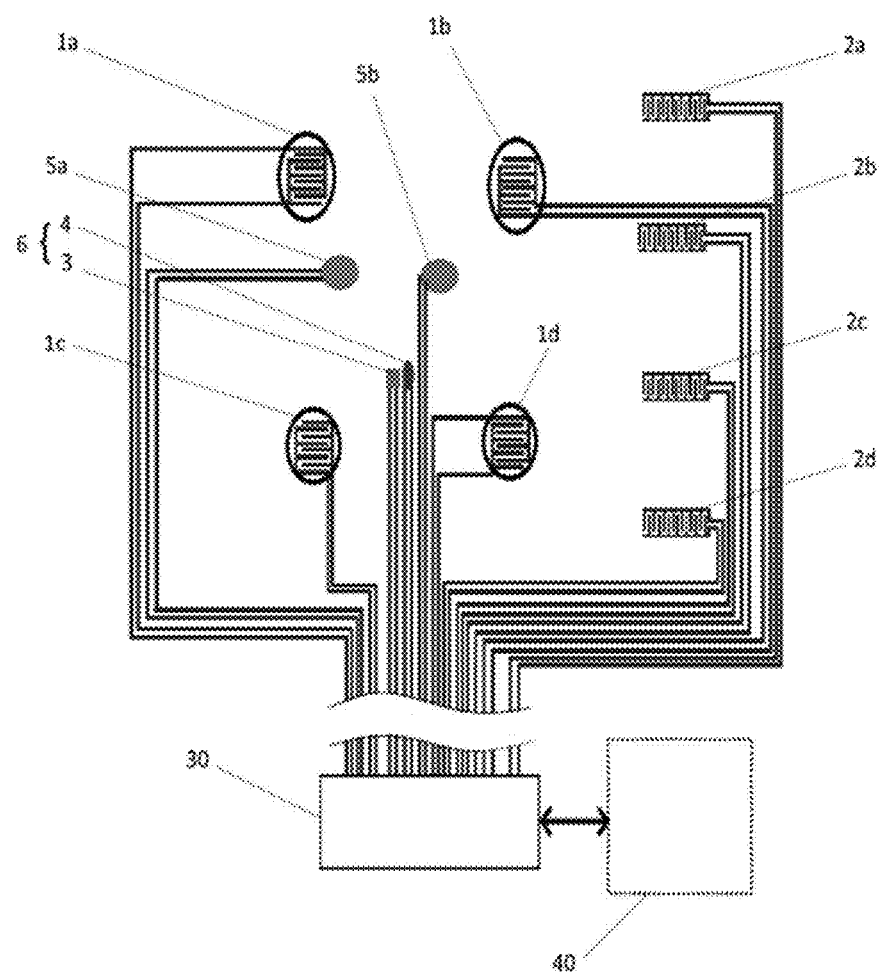
FIG. 1 shows an example of temperature and/or humidity sensor and a measurement system.

Now referring to FIG. 1 which shows an example of implementation of a seat comprising a form (not shown) and a set of sensors.

For example, the foam is a polyurethane foam with predetermined physical and electrical characteristics. These characteristics vary with the temperature and humidity of the foam, which can disrupt measurements made by the pressure sensors, in particular capacitive sensors.

One or more temperature and/or humidity sensors can thus be used for compensating, depending on humidity and/or temperature of the foam, static measurements, dynamic measurements and compression measurements done with capacitive sensors arranged on the foam of a seat by means of flexible substrates having the same hardness as the foam.

As shown, a measurement system comprises four circular type capacitive sensors $1a$, $1b$, $1c$, $1d$. Further, the measurement system comprises four rectangular type capacitive sensors $2a$, $2b$, $2c$, $2d$.

In the case shown here, the set of sensors also comprises a temperature sensor 3 and a humidity sensor 4, which together define a temperature and humidity sensor 6.

Without limitation, a single temperature and humidity sensor 6 may be used or two separate sensors, one for temperature and one for humidity, may be used.

According to an embodiment, the set of sensors also comprises resistive pressure sensors $5a$ and $5b$.

The sensors, and in particular the capacitive sensors in contact with the foam and also the temperature and/or humidity sensor, are connected to a controller 30, where the controller 30 is further connected to a compartment bus of known type 40.

For example, the bus 40 is capable of sending measurements to an external monitoring device, which can in particular manage the phases of autonomous operation or manual driving of the vehicle.

Although the sensors are shown as being connected to the controller 30 by wire, other connection modes may be used, for example wireless connection modes, preferably Bluetooth type.

According to other embodiments not shown, other sensors may also be present, for example presence sensors, weight determination sensors, posture determination sensors or even sensors for determination of an individual's physiological parameters.

The measurements from a particular selection of capacitive sensors may be used to filter and/or eliminate movements or vibrations which would be undesirable.

For example, vibrations of the vehicle or vibrations of the user occupying the seat, which might not be due to their position or their movements but instead to the vibrations of the vehicle itself, can affect the measurements and create noise relative to the measured signals, in particular measured pressures.

Filtering and/or elimination of these vibrations by means of a combination of signals measured by a given set of some capacitive sensors serves to improve the signal-to-noise ratio, isolate some parameters to be measured or even eliminate undesirable artifacts.

For example, the measurements provided by the circular interdigital electrodes 1a, 1b, 1c, 1d can be used in order to filter and/or eliminate vibrations of the vehicle measured by the sensors with rectangular interdigital electrodes 2a, 2b, 2c, 2d.

Figure 2:
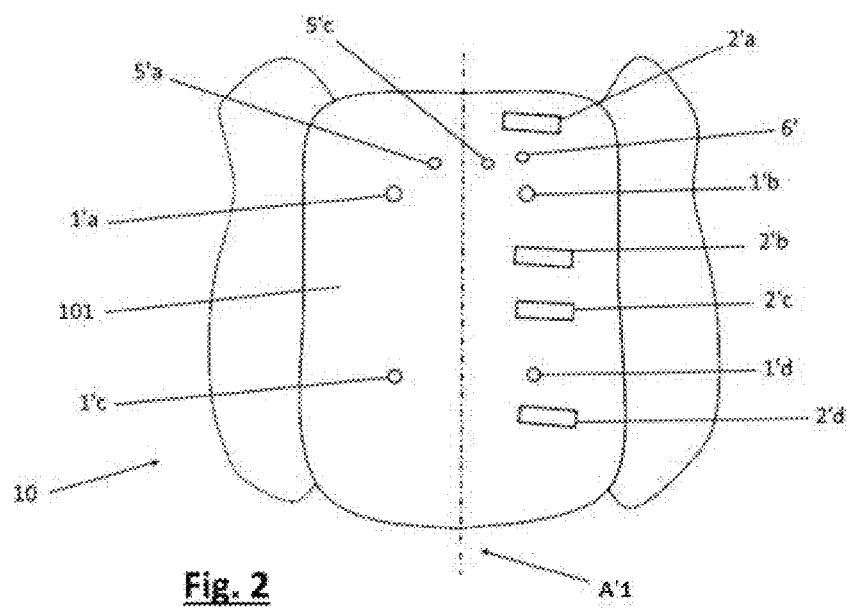
FIG. 2 shows an example of positioning of sensors on foam for a seat cushion of a seat.

Now referring to FIG. 2, which shows an example of sensor positioning on a seat cushion of a seat, in particular a seat comprising foam.

Herein, the seat typically comprises a seat cushion and a seatback arranged for receiving a user, whose position in the seat defines various contact points, and therefore pressure points, with the foam covering the seat or some elements thereof.

As shown, capacitive sensors are distributed on a foam block 101 covering one or more parts of the seat cushion 10, where the foam block forms a measurement zone. A sample placement of these sensors is described below.

Depending on the location of each sensor, a position of an exerted pressure can be deduced from the detection of a compression of the foam.

Typically, each capacitive sensor is adapted for measuring a given temperature and humidity.

By changing the temperature and/or humidity, it is possible to compensate this measurement. In other words, it is thus possible to measure a pressure independent of the variability of the temperature and humidity.

The seat cushion 10 comprises a temperature and humidity sensor 6', or as a variant, a sensor 6' combining a temperature sensor and humidity sensor is arranged on the top of the block 101 of the seat cushion. The sensor 6' may also comprise only a temperature sensor or only a humidity sensor.

This way, a means of temperature and/or humidity measurement can be positioned in a zone which could be hot and/or humid when the user occupies the seat cushion 10 of the seat. For a user of average height and weight, this zone generally has the greatest temperature and/or humidity variations.

The seat cushion 10 also comprises a pressure measurement system, where the measurement system here includes four capacitive sensors with circular interdigital electrodes 1'a, 1'b, 1'c, 1'd which are distributed on the front and rear of the cushion.

For example, the four sensors 1'a, 1'b, 1'c, 1'd are positioned on either side of the central longitudinal axis A'1 and distributed pairwise in the front and rear part of the seat cushion 10, on either side of the central longitudinal axis A'1 of the foam block 101.

This way, the pressure exerted near the legs and on each side of the butt of the user can be measured.

Also this way, the movements of the pelvis of the user, the lever arm of the leg or the pressure of the legs when the feet of the user are on the floor or, for the driver, on the vehicle pedals can also be measured.

The seat 10 also comprises two resistive sensors, for example two resistive sensors 5'a, 5'b with circular resistive electrodes. These two resistive sensors are substantially centered on the main supporting zone of an average user on the foam block 101 on either side of the central longitudinal axis A'1.

Such resistive sensors advantageously serve as total pressure sensors for determining, for example, the value of the weight of the user of the seat cushion 10.

The seat cushion 10 further comprises four capacitive sensors with rectangular interdigital electrodes 2'a, 2'b, 2'c, 2'd distributed on a single side relative to the longitudinal central axis A'1 and along it.

With these sensors, vibrations of the seat cushion of the seat, or even micro-vibrations which could come from the user of the seat bottom 10 can be measured.

For example, it could happen that the user is not in contact with all the capacitive and/or resistive sensors located in the seat. In such a case, the sensors which are not in contact are mainly sensitive to vibrations of the vehicle and of the seat, which can be used for compensating for artifacts which are not connected with the user.

The distribution of the previously described sensors, and also the number thereof, serves to clearly separate and distribute the measurements made by these sensors in the measurement zone or at least near it.

Figure 3:
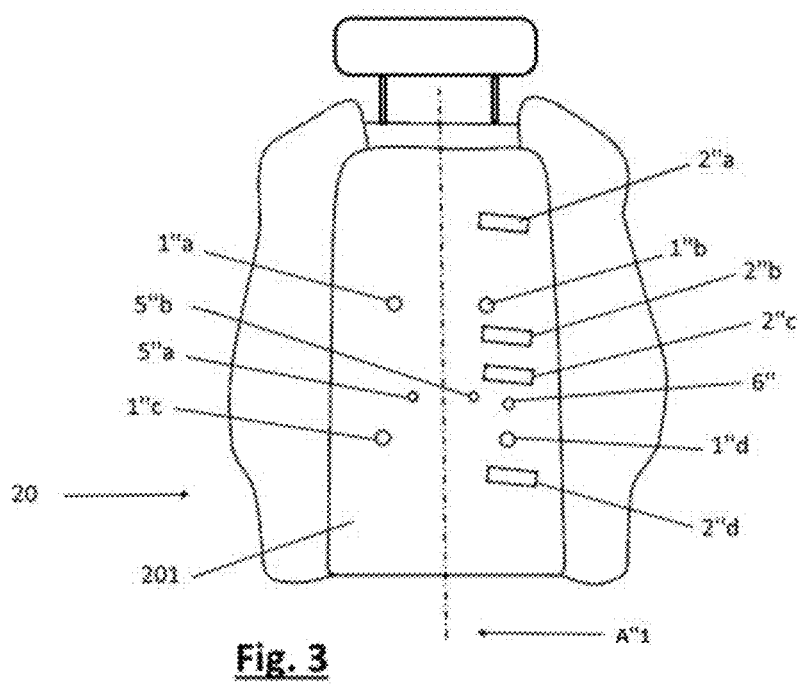
FIG. 3 shows an example of positioning of sensors on foam for a seatback of a seat.

Now referring to FIG. 3, which shows an example of sensor positioning on a seatback of a seat, in particular a seat comprising foam.

As shown, sensors are distributed over a foam block 201 covering one or more parts of a seatback 20 of the seat.

In the case shown here, the set of sensors comprises a temperature and humidity sensor 6", which is arranged on top of the foam block 201 of the seatback cushion, in a zone most likely to be hot when an average height user is seated in the seat.

The set of sensors also comprises a measurement system comprising four capacitive sensors 1"a, 1"b, 1"c, 1 for example circular type interdigital capacitive sensors.

For example, the four sensors 1"a, 1"b, 1"c, 1"d are positioned on either side of the central vertical axis A"1 and distributed pairwise in the front and rear part of the seat cushion 20, on either side of the central longitudinal axis A"1 of the foam block 201.

The distribution of the support pressure on the seatback and in particular the distribution of pressure depending on the height of the user and the movement of the user relative to the seatback 20 can be measured with these capacitive sensors.

The measurement system also comprises four capacitive sensors 2"a, 2"b, 2"c, 2"d. These four sensors 2"a, 2"b, 2"c, 2"d, here of rectangular type, are distributed on a single side relative to the vertical central axis A"1 and along it.

With these sensors, vibrations of the seatback of the seat, or even micro-vibrations which could come from a user pressing on the seatback 20 can be measured.

Herein, micro-vibrations are typically vibrations of the vehicle and/or of the seat affecting the pressure sensors arranged therein, because these sensors also vibrate and introduce errors.

The seatback 20 also comprises two resistive sensors, for example two resistive sensors 5"a, 5"b with circular resistive electrodes. These two resistive sensors are substantially centered on the main supporting zone of an average user on the foam block 201 on either side of the central vertical axis A"1.

Such resistive sensors serve as total pressure sensors for determining, for example, the value of a force or pressure exerted by a user bearing on the seat back 20.

Doing that, at least some sensors located in the measurements zone constitute first pressure sensors arranged in longitudinal alignment on either side of the foam block of the seat cushion 10 of the seat and/or in vertical alignment on one side of a foam block of seatback 20 of the seat, in order to measure pressures, vibrations or micro-vibrations of the seat in the one or more measurement zones thus defined.

Even though the example from FIG. 2 and the example from FIG. 3 comprise the same number of similarly distributed sensors, it is possible to arrange the sensors differently and in particular to use fewer or more than four rectangular sensors.

Figure 4:
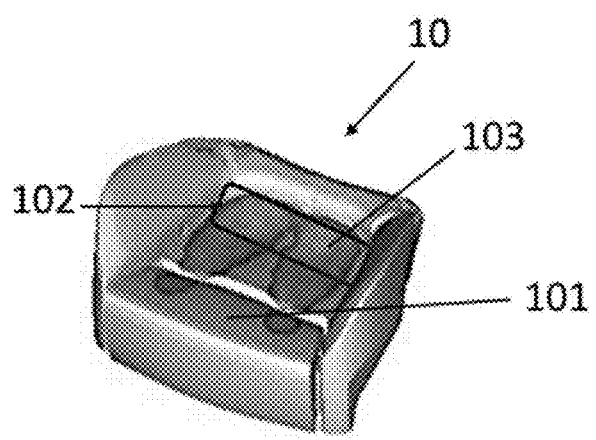
FIG. 4 shows an example of measurement zone for a seat cushion of a seat for a user of this seat.

Now referring to FIG. 4, which shows an example of measurement zone formed by foam for a seat cushion of a seat.

In particular, a measurement zone 102 partially or wholly formed by foam 101 can be defined on or in the seat cushion 10 of the seat.

For example, the measurement zone 102 may comprise a surface of the foam 101 which includes sensors 1'a, 1'b, 5'a, 5'c, 2'a and 6' of the seat cushion 10.

This way, a surface distribution zone 103 of pressure, temperature and/or humidity for the measurement zone 102 can be determined once or continuously. In particular, this distribution zone is determined when a user is seated on the foam 101 of the seat cushion 10.

As an illustration, and when a user occupies the seat, hotter and more humid parts of the distribution zone 103 are located in the rear part of the seat cushion 10.

The measurement zone 102 is located near this rear part, where greater and more frequent pressure, temperature and/or humidity variations are expected because of the presence of a user seated on the seat cushion 10.

Figure 5:
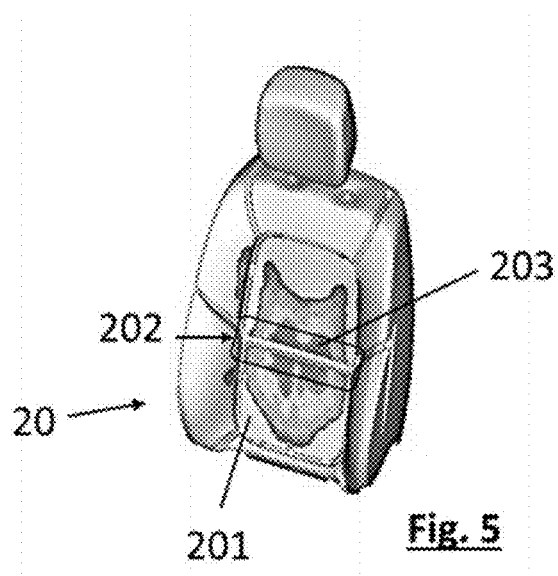
FIG. 5 shows an example of measurement zone for a seatback of a seat for a user of this seat.

Now referring to FIG. 5, which shows an example of measurement zone formed by foam of a seatback of a seat.

In particular, a measurement zone 202 partially or wholly formed by foam 201 can be defined on or in the seatback 20 of the seat.

For example, the measurement zone 202 may comprise a surface of the foam 201 which includes sensors 5"a, 5"b, 2"c and 6" of the seatback 20.

This way, a surface distribution zone 203 of pressure, temperature and/or humidity for the measurement zone 202 can be determined once or continuously. In particular, this distribution zone is determined when a user is seated in the seat and resting on the foam 201 of the seatback 20.

As an illustration, and when a user occupies the seat, hotter and more humid parts of the distribution zone 203 are generally located near an intermediate part in the middle of the height of the seatback 20.

The measurement zone 202 is located near this intermediate part, where greater and more frequent pressure, temperature and/or humidity variations are expected because of the presence of a user bearing on the seatback 20.

To make the ideas more concrete, the maximum pressure generally apply by a user on the seat cushion 10 is of order 70 $g/cm^2$ and the maximum pressure generally applied on the seatback 20 is of order 90 $g/cm^2$.

It should be noted that even if no user occupies the seat, seat bottom or rests on the seat back of the seat, the foam of these elements still has, just the same, a nonzero compression because of the aging of the foam.

A typical measured temperature varies typically between 10° C. and 40° C.

For example, implementation of automatic learning or machine learning systems within the controller 30 serves to adapt the measurement system and the management of the capacitive sensors according to the preferred measurement ranges.

Figure 6:
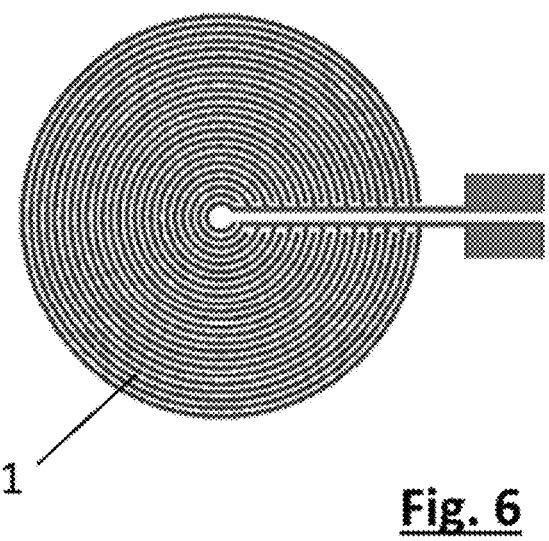
FIG. 6 shows an example of circular interdigital capacitive sensor.

Now referring to FIG. 6, which shows an example of circular interdigital capacitive sensor.

Such a sensor is for example formed from a printed circuit board, and/or comprises a ceramic substrate and also various conducting layers of titanium, copper, nickel or gold.

Such a sensor can have different types of geometry, for example spiral, concentric or elliptical.

Such a sensor has a rotational symmetry such that the capacitance thereof is less sensitive to the relative orientation compared to asymmetric geometry sensors, for example a rectangular geometry sensor.

Figure 7:
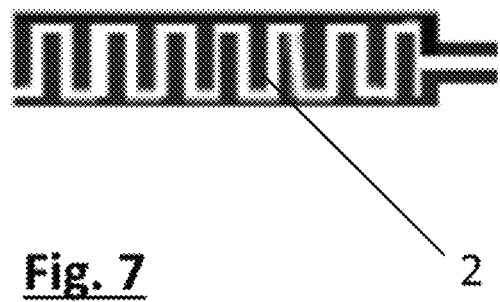
FIG. 7 shows an example of rectangular interdigital capacitive sensor.

Now referring to FIG. 7, which shows an example of rectangular interdigital capacitive sensor.

Such a sensor is for example formed from the same elements as the previously described circular interdigital capacitive sensor.

A rectangular interdigital capacitive sensor has a reduced volume and allows measuring rapid variations, of order a microsecond.

Further, a rectangular interdigital capacitive sensor serves to measure a relative compression included between 0 and 0.25, providing a sufficient sensitivity for measuring microvibrations, and for example micro-vibrations resulting from the heart rhythm of the user of the seat.

Circular electrodes are preferably used for pressure distribution measurements and rectangular electrodes are preferably used for micro-vibration measurements.

Figure 8:
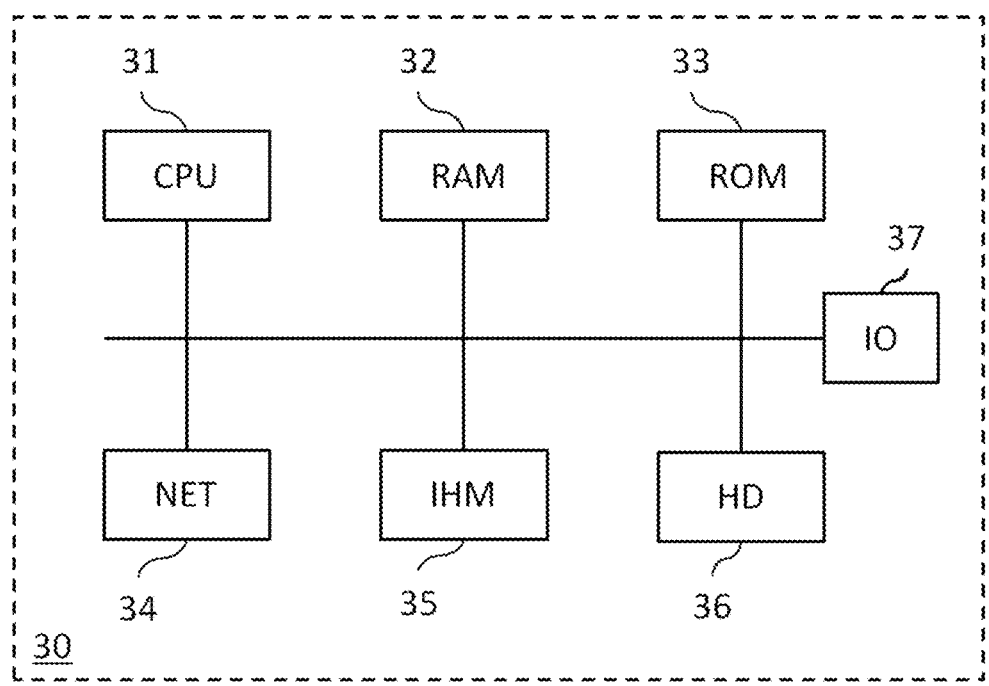
FIG. 8 shows an example of schematic block-diagram for controller.

FIG. 8 shows a schematic block-diagram example of a controller according to an implementation example.

According to an example, the controller is an information-processing circuit, for example a system-on-a-chip.

The controller 30 is arranged for implementing a determination of a compensation suited for a pressure measured by a system comprising at least one capacitive sensor and connected to the controller 30, where this compensation is determined based on a temperature and/or humidity provided by at least one temperature and/or humidity sensor connected to the controller 30.

Without limitation, the controller 30 comprises a communication bus connected, for example, to a central processing unit 31 such as a processor or a microprocessor and labeled CPU. For example, this communication bus can be the bus 40 previously described.

The controller 30 also comprises a random access memory 32, labeled RAM, to store the executable code for the security method and also the registers suited for storing variables and parameters necessary for implementation of the method according to the embodiments where the memory capacity thereof can be supplemented by optional RAM memory connected to an extension port, for example.

Further, the controller 30 comprises a read-only memory 33, labeled ROM, for storing computer programs for implementing embodiments, and also a network interface 34 which is normally connected to a communication network over which digital data to be processed are transmitted or received.

The network interface 34 can be a single network interface, or composed of a set of different network interfaces (for example wired and wireless, interfaces or different types of wired or wireless interfaces).

Data packets are sent over the network interface for transmission or are read from the network interface for reception under the control of the software application run on the processor or microprocessor 31.

Further, the controller 30 comprises a user interface 35 for receiving input from a user or for displaying information for a user, an optional storage medium 36 labeled HD, and an input/output module 37 labeled IO, for receiving and sending data from or to external peripherals such as a hard drive, removable storage medium or other.

In an example shown here, the executable code can be stored in a read-only memory 33, on a storage medium 36 or on a removable digital medium such as for example a drive.

According to a variant, the executable code for the programs can be received by means of a communication network, via the network interface 34, in order to be stored in the storage medium 36 before being executed.

The controller 30 is equipped with one or more memories comprising and configured for executing one or more programs.

The central processing unit 31 is suited for controlling and directing the execution of instructions or software code portions from the program or programs according to one of the embodiments, for which the instructions are stored in one of the aforementioned storage means. After powering up, the CPU 31 is capable of executing instructions stored in the main RAM memory 320, relative to a software application, after these instructions have been loaded from the ROM for example.

In the example shown here, the controller 30 is a programmable unit which uses software. However, secondarily, the present description can be implemented in any kind of hardware (for example in the form of an application-specific integrated circuit or ASIC).

In an example not shown, for processing measurements collected from the sensors, the controller 30 is also provided with a device for filtering noise and in particular filtering the noise generated by the vibrations due to the operation of the vehicle and/or the movement thereof.

The controller 30 is arranged for being connected to a measurement system comprising one or more of these capacitive sensors previously described. Further, the controller 30 is arranged for being connected to a temperature and/or humidity sensor as previously described.

In an example, the measurement system previously described comprises the controller 30.

In other examples, the controller 30 is incorporated in the seat or other elements of a vehicle which comprises this seat, for example an instrument panel of a vehicle or even in one of the capacitive sensors previously described.

In even other examples, the measurement system and at least one temperature and/or humidity sensor are arranged for being connected to a plurality of controllers configured for determining together a compensation.

In order to determine a compensation suited to at least one measured pressure, a sequence of measurements is implemented. For example, such a measurement sequence is started by the controller 30 when a user sits on the seat at a moment $T_0$.

For normal operation, it is desirable that, during start up, the pressure exerted on the seat cushion 10 is less than that of the same order of magnitude as the pressure exerted on the seatback 20 at $T_0+2$ seconds.

Some initial measurements of detection of the user, for example an estimate of the weight or of a position of this user in the seat, are done, and a corresponding state of the user is sent to the controller 30 at $T_0+3$ seconds.

The response time of the system for full implementation thereof is less than 10 seconds.

The system then monitors the state of the user of the seat during operation of the vehicle by collecting the measurements made by the sensors connected to the controller 30.

According to various examples, the controller 30 comprises one or more programs configured for implementing various actions such as described below.

A sample program implemented by the controller 30 is a program configured for estimating a weight of a user occupying the seat.

Another program implemented by the controller 30 is a program configured for detecting movements of the user occupying the seat, for example depending on movements of the legs thereof, briefly leaning on the seatback or on the seat cushion of the seat, repositioning or twisting of their back against the seat back, slumping of the shoulders, wriggling or other postural changes which could lead to suspect fatigue, an attempt to combat falling asleep or even a drop in attention.

Again, another sample program implemented by the controller 30 is a program configured for determining a type of user occupying the seat, for example whether this user is an adult or a child. With this program it is also possible to determine whether the seat is occupied by a human, an object, etc.

Again another sample program implemented by the controller 30 is a program configured for suspecting falling asleep or a state not suitable for driving or taking over control of an autonomous vehicle by a user occupying the seat.

In the context of the present, one or more seats of the vehicle can be equipped with the measurement system in a more or less complete version. For example, the system may comprise a reduced number of sensors of each type or comprise only some of the pressure sensors like for example circular interdigital electrode sensors compensated by a temperature and humidity sensor for detecting the height of the user and their movements, in particular in the case of the passenger seat.

Unless otherwise indicated, the shared or analogous elements across several figures bear the same reference signs and have identical or analogous characteristics, such that the shared elements are not generally described again in the interest of simplicity.

The present description relates first to a seat comprising: at least one temperature and/or humidity sensor; foam; and a measurement system comprising at least one capacitive sensor in contact with the foam and adapted for measuring pressure exerted on the foam by a user, wherein a compensation suited to the measured pressure is determined based on a temperature and/or a humidity provided by the at least one temperature and/or humidity sensor.

Herein, a capacitive sensor is a sensor comprising at least one electrode, where the electrode serves to detect and measure a distance variation and, indirectly, a pressure or a pressure variation.

Herein, the at least one electrode forms a capacitor with the foam. Thereafter, even a slight compression of the foam causes a movement of the at least one electrode, which is measurable. The determination of a distance variation is obtained from the capacitance of the capacitor, where the value of the capacitance varies proportionally with the permittivity of the dielectric medium between the sensor and the foam. Further, the capacitance varies proportionally with the surface area of the electrode of the sensor, and inversely with the distance.

Herein, a compensation suited to the measured pressure is defined as a compensation of the foam with which to balance the measured pressure. A variation of the capacitance of the one or more capacitive sensors in contact with the foam results when there is pressure on the foam.

The permittivity, more precisely the dielectric permittivity, varies with the nature of the material, the temperature and the humidity. Consequently, a capacitive variation of a capacitance sensor can be locally compensated with a temperature and/or humidity variation.

The temperature and/or humidity sensor(s) serve to provide measurements with which to compensate the measurements from other types of sensors, and in particular, from the at least one capacitive sensor.

It is therefore possible to compensate for the variations of the physical and electrical properties of the foam covering a seat occupied by a user depending on the temperature, humidity or both.

In a specific example, the at least one temperature and/or humidity sensor is solely a temperature sensor.

In another specific example, the at least one temperature and/or humidity sensor is solely a humidity sensor.

The use of a temperature sensor alone limits the complexity of the system. It is however possible to consider several humidity and/or temperature sensors distributed in one or more measurement zones, or to provide only one humidity sensor or temperature sensor in a less complex system.

In particular, the seat may comprise two distinct sensors, a first sensor configured for determining a temperature and a second sensor configured for measuring humidity.

In another specific example, the at least one temperature and/or humidity sensor is a sensor suited for determining both temperature and humidity.

According to a specific embodiment, the seat further comprises at least one resistive sensor configured for measuring an overall pressure in the at least one measurement zone of the seat cushion and/or seatback of the seat.

In a specific example, the at least one resistive sensor is a piezoresistive sensor.

A mechanical stress experienced by an element, and in particular by the foam, can be measured with a piezoresistive sensor from a variation of the resistivity of this element.

Advantageously, a piezoresistive sensor has reduced dimensions making it easier to incorporate it in a seat. A piezoresistive sensor also has a large measurement range, good impact resistance, a working temperature range below 100° C. and a bandwidth varying from 0 to several hundred hertz.

According to an embodiment, the seat is an automotive vehicle seat, for example a level 3 or level 4 autonomous vehicle seat.

According to a specific embodiment, the foam forms at least one measurement zone for a seat cushion and/or a seatback of the seat, wherein: the at least one temperature and/or humidity sensor is located in the at least one measurement zone; and the measurement system comprises a plurality of capacitive sensors in contact with the foam and adapted for measuring, in the at least one measurement zone, a pressure exerted on the foam by a user, where the measurement system and the temperature and/or humidity sensor are arranged for being connected to a controller configured for determining the compensation.

This way, a measurement zone can be defined in the foam relative to which a user could position themselves and in which various sensors are distributed which are able to precisely determine a suitable compensation.

The compensation determined by the controller on the basis of the measurements done by the temperature and/or humidity sensor allow a precise measurement of pressure variations and compensation determination.

This way, enriched physiological data for a user occupying the seat can also be deduced by combination with other types of sensors.

The measurements and determinations are implemented with a rapid response time, where this response time is typically less than 10 seconds, meeting the standards associated with the driver of level 3 or 4 autonomous vehicles. Services adapted to the users of such vehicles can also be provided.

According to a specific embodiment, at least one capacitive sensor is an interdigital capacitive sensor.

Herein, an interdigital sensor, and in particular an interdigital capacitive sensor, is a sensor formed of at least one metal plate or at least one electrode arranged in comb shape, and preferably, having two surfaces opposite each other.

An interdigital sensor provides a sensor with reduced volume but with maximized useful surface area, which increases the capacitance of the sensor and the sensitivity thereof.

In a specific example, the at least one capacitive sensor is a rectangular type interdigital capacitive sensor.

In another specific example, the at least one capacitive sensor is a circular type interdigital capacitive sensor.

According to a specific embodiment, at least one capacitive sensor is located in the at least one measurement zone.

This way, a temperature and/or humidity measurement jointly localized with a pressure measurement, or at least close thereto, can be done.

According to a specific embodiment, at least some capacitive sensors constitute first pressure distribution measurement sensors located on either side of a central longitudinal axis of the seat cushion of the seat.

According to a specific embodiment, at least some capacitive sensors constitute second pressure distribution measurement sensors located on either side of a central vertical axis of the seatback of the seat.

According to a specific embodiment, the seat also comprises at least two resistive sensors adapted for measuring a total pressure exerted on the foam by a user.

According to a specific embodiment, at least some resistive sensors are arranged on either side of a central longitudinal axis of the seat cushion of the seat and/or a central vertical axis of the seatback of the seat.

Secondarily, the present application relates to a controller arranged for being connected to a measurement system and a temperature and/or humidity sensor for a seat conforming to the preceding specific embodiments.

In a specific example, the controller is arranged for being connected to the measurement system and to a temperature sensor.

In another specific example, the controller is arranged for being connected to the pressure measurement system and to a humidity sensor.

According to a specific embodiment, the controller is arranged for being connected to the pressure measurement system and to a temperature and humidity sensor.

According to a specific embodiment, the controller is included in the seat, in the temperature and/or humidity sensor, in the foam or in the measurement system.

There is a growing demand for devices for detection, classification and analysis of movements by a vehicle seat occupant, and in particular an automotive vehicle seat occupant.

In particular, this application is significant for the case of drivers and passengers of level 3 autonomous vehicles, which corresponds to a conditional automation level for which the driver delegates driving of the vehicle under preset situations but should, in any case, be capable of taking control when the vehicle indicates to the driver that it is incapable of managing the situation.

Further, this application is significant for the case of drivers and passengers of level 4 autonomous vehicles, which corresponds to a higher automation level for which the car is capable of moving without continuous involvement by the driver, where the driver however remains under the obligation of taking control when the vehicle leaves an automated driving scenario.

In this context, there are systems for monitoring a user occupying a vehicle seat, for example a driver. These systems implement sensors arranged for measuring physical and physiological attributes of people present in the vehicle. For example, the level of fatigue of a driver of a car can be monitored with the help of a camera, and the position of a passenger can be checked with the help of a movement sensor located in the seat cushion of the seat or above the seat, etc.

Comparative measurement devices may comprise sensors for measuring parameters such as the weight of an occupant of a seat or even the pressure exerted locally in the seat by this occupant. Just the same, at this time the measurements obtained by such comparative devices are relatively imprecise. Further, the measurements coming from these devices are obtained with a response time that is generally long and inappropriate for providing data sufficiently quickly, even in real time, to a system monitoring an occupant of an autonomous vehicle seat. For example, a system for monitoring the state of a driver of an autonomous vehicle should be capable of very quickly identifying whether this driver is capable of taking over driving of the vehicle.

Therefore, these comparative devices are often unusable for providing services suited for occupants of autonomous vehicle seats, and in particular for level 3 or 4 autonomous vehicles.

The invention claimed is:

1. A seat comprising:
    a seat cushion comprising foam;
    a seatback;
    at least one of a temperature and of a humidity sensor;
    a pressure measurement system; and
    a compensation suited to the measured pressure determined based on a temperature and/or a humidity provided by the at least one temperature and/or humidity sensor;
    wherein the pressure measurement system comprises a plurality of interdigital capacitive sensors in contact with the foam and adapted for measuring pressure exerted on the foam, wherein each interdigital capacitive sensor is formed of at least one electrode arranged in a comb shape; and
    wherein the plurality of interdigital capacitive sensors are positioned on either side of a central longitudinal axis of the seat cushion.

2. The seat of claim 1, wherein the foam forms at least one measurement zone for the seat cushion and/or the seatback of the seat, wherein:
    the at least one temperature and/or humidity sensor is located in the at least one measurement zone; and
    the pressure measurement system comprises the plurality of capacitive sensors in contact with the foam and adapted for measuring, in the at least one measurement zone, a pressure exerted on the foam by a user,
    where the pressure measurement system and the temperature and/or humidity sensor are arranged for being connected to a controller configured for determining the compensation.

3. The seat of claim 2, wherein at least one interdigital capacitive sensor is located in the at least one measurement zone.

4. The seat of claim 3, wherein at least some of the interdigital capacitive sensors constitute first pressure distribution measurement sensors located on either side of a central longitudinal axis of the seat cushion of the seat.

5. The seat of claim 4, wherein at least some of the interdigital capacitive sensors constitute second pressure distribution measurement sensors located on either side of a central vertical axis of the seatback of the seat.

6. The seat of claim 5, wherein the seat further comprises at least two resistive sensors adapted for measuring a total pressure exerted on the foam by a user.

7. The seat of claim 6, wherein at least some of the resistive sensors are arranged on either side of a central longitudinal axis of the seat cushion of the seat and/or a central vertical axis of the seatback of the seat.

8. A controller arranged for being connected to a pressure measurement system and to a temperature and/or humidity sensor for a seat according to claim 1.

9. The controller of claim 8, wherein the controller is comprised in the seat, preferably in the temperature and/or humidity sensor, in the foam or in the pressure measurement system.

10. The seat of claim 1, wherein each interdigital capacitive sensor comprising a ceramic substrate and conducting layers, the conducting layer comprising at least one layer among a layer of titanium, a layer of copper, a layer of nickel, and a layer of gold.

11. The seat of claim 1, wherein each interdigital capacitive sensor is formed from a printed circuit board.

* * * * *